(12) United States Patent
Steijaert et al.

(10) Patent No.: US 6,485,148 B2
(45) Date of Patent: Nov. 26, 2002

(54) METHOD AND DEVICE FOR POSITIONING A HOLDER WITH RESPECT TO A CARRIER

(75) Inventors: Hans Alphonsius Maria Steijaert, Eindhoven (NL); Richard Van Der Laan, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/837,037

(22) Filed: Apr. 18, 2001

(65) Prior Publication Data

US 2001/0033368 A1 Oct. 25, 2001

(30) Foreign Application Priority Data

Apr. 21, 2000 (EP) .............................. 00201449

(51) Int. Cl.7 .............................................. G03B 21/14
(52) U.S. Cl. ...................................................... 353/119
(58) Field of Search .................................. 353/119, 120

(56) References Cited

U.S. PATENT DOCUMENTS

| | | | | | |
|---|---|---|---|---|---|
| 1,639,815 | A | * | 8/1927 | Siebrandt ...................... | 602/16 |
| 5,237,399 | A | * | 8/1993 | Inada et al. .................. | 348/761 |
| 5,283,599 | A | * | 2/1994 | Tejima et al. .................. | 349/8 |
| 5,651,599 | A | | 7/1997 | Fujimori et al. .............. | 353/61 |
| 6,053,616 | A | * | 4/2000 | Fujimori et al. ............. | 353/119 |
| 6,322,217 | B1 | * | 11/2001 | Fujimori et al. ............ | 353/119 |

* cited by examiner

*Primary Examiner*—Russell Adams
*Assistant Examiner*—Michelle Nguyen

(57) ABSTRACT

Method and device for aligning a holder with respect to a carrier. The holder comprises at least one slot, whilst the carrier comprises a carrier plate and at least one bar. The bar is pivotally connected to the carrier plate with a first end, and to an element capable of sliding movement in said slot with an end remote from said first end. Once the holder has been positioned with respect to the carrier, the element is connected to the holder.

10 Claims, 1 Drawing Sheet

METHOD AND DEVICE FOR POSITIONING A HOLDER WITH RESPECT TO A CARRIER

TECHNICAL FIELD

The invention relates to a method of positioning a holder with respect to a carrier.

BACKGROUND AND SUMMARY OF THE INVENTION

In such a method and device, which is known from U.S. Pat. No. 5,651,599, the holder comprises a light modulation panel and the carrier is an optical element which is to be aligned with respect to the light modulation panel. To this end, use is made of an adjusting mechanism which has a plurality of dowels and eccentric pins which are connected to the carrier. The holder has a plurality of slots through which the dowels and pins extend. The position of the holder with respect to the carrier is adjusted by means of the eccentric pin, whereafter the holder and the carrier are rigidly connected together by means of screws.

A drawback of such a method is that it requires a relatively large number of operations before a holder is aligned in six degrees of freedom with respect to a carrier. These six degrees of freedom comprise three translation directions extending transversely to each other and three directions of rotation situated transversely to each other.

It is an object of the invention to provide a method in which a holder can be positioned in a simple manner with respect to a carrier in at least one direction, and subsequently fixed.

In the method according to the invention, the object is achieved in that the holder has at least one slot, while the carrier is provided with a carrier plate and at least a bar, a first end of which is pivotally connected to the carrier plate and an end remote from the first end is pivotally connected to an element which is slidable in the slot, the element being connected to the holder after positioning the holder with respect to the carrier.

After connection of the holder with the carrier, the holder is fixed with respect to the carrier in a direction extending parallel to the bar.

An embodiment of the method according to the invention is characterized in that the carrier is provided with at least six bars situated in planes extending transversely to the carrier plate, while at least two bars extend away from each other in a first plane extending transversely to the carrier plate, at least two bars extend away from each other in a second plane extending transversely to the carrier plate, and at least two bars extend away from each other in a third plane situated parallel to the second plane and transversely to the first plane, the holder being fixed with respect to the carrier in six degrees of freedom after connection to the elements.

The bars situated in the first plane and extending transversely away from each other, extend away from each other in a direction situated parallel to the carrier plate. By connecting the holder with these bars, a displacement of the holder in this direction extending parallel to the carrier plate can be prevented. Similarly, a displacement of the holder with respect to the carrier can be prevented in a direction in the second and the third plane and parallel to the carrier plate by means of the four bars situated in the second and the third plane. The holder can be fixed with respect to the carrier in a direction extending transversely to the carrier plate by means of the six bars extending transversely to the carrier plate. Moreover, the holder can also be blocked against pivoting about axes extending parallel and transversely to the carrier plate by means of the six bars extending transversely to the carrier plate. During positioning of the holder with respect to the carrier, the elements connected to the bars can slide through the slots and the elements can pivot with respect to the bars and the carrier plate. The holder is thus positionable in six degrees of freedom with respect to the carrier. After subsequent connection of the elements with the holder, the displacement of the holder in each of these six degrees of freedom is suppressed effectively.

The invention also relates to a device by means of which a holder can be positioned in a simple way with respect to a carrier, and subsequently fixed.

In the device according to the invention, this object is achieved in that the holder has at least one slot, while the carrier is provided with a carrier plate and at least a bar, a first end of which is pivotally connected to the carrier plate and an end remote from the first end is pivotally connected to an element which is slidable in the slot, the element being connectable to the holder.

The bar prevents a displacement of the holder with respect to the carrier in a direction parallel to the bar.

These and other aspects of the invention are apparent from and will be elucidated with reference to the embodiments described hereinafter.

BRIEF DESCRIPTION OF THE DRAWINGS

In the drawings.

Corresponding components in the Figures are denoted by the same reference numerals.

DETAILED DESCRIPTION

Figure 1:
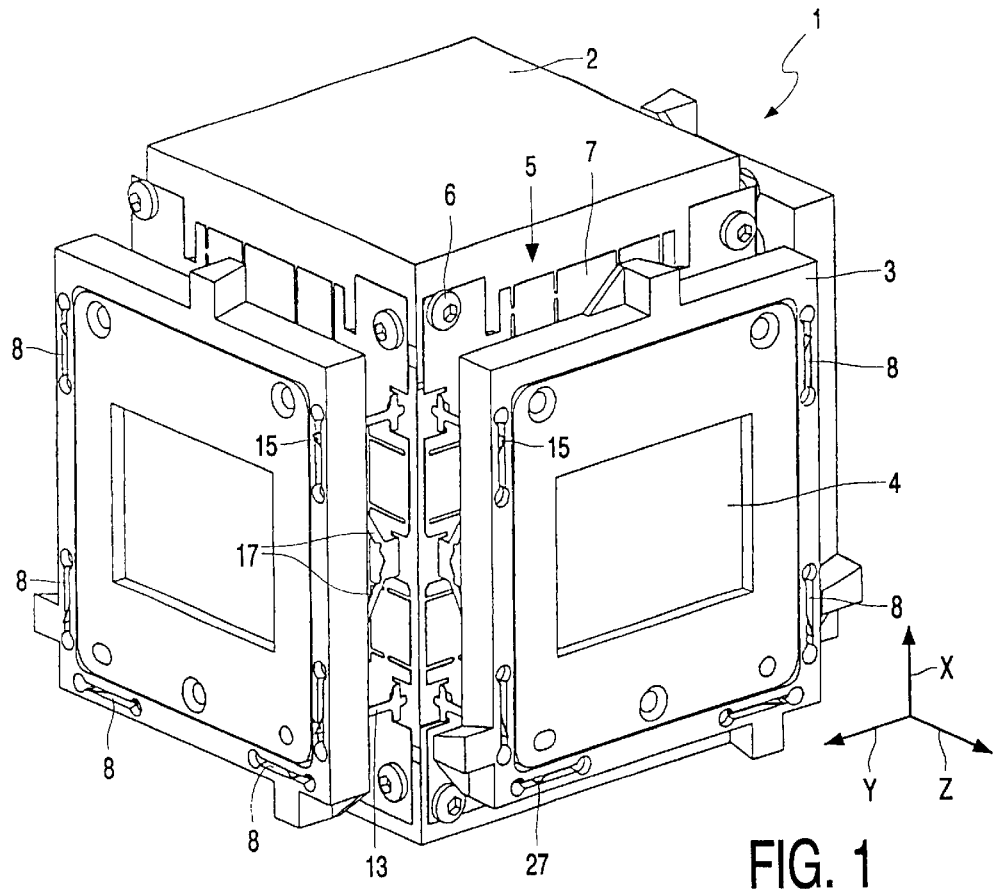
FIG. 1 is a perspective elevational view of a device according to the invention.

FIG. 1 shows a device 1 according to the invention, comprising a prism 2 and three holders 3 which are positioned with respect to the prism 2. Each holder 3 accommodates a light modulation panel 4. The device 1 forms part of a projection system in which each light modulation panel 4 is illuminated by light of a different color and in which light beams coming from the different light modulation panels 4 are combined with each other by means of the prism 2. To obtain a desired image of the light beam coming from the prism 2, the light modulation panels 4 should be accurately positioned with respect to each other and notably with respect to the prism 2. Such a positioning is obtained by means of the positioning device 5 according to the invention, which comprises a carrier 7 connected by means of screws 6 to the prism 2, and the holder 3 co-operating with the carrier 7. The holder 3 has six solts 8 extending along the circumference of the holder 3. Two pairs of slots 8 extend on both sides of the light modulation panel 4 in a direction denoted by X in the system of co-ordinates. The two other slots 8 extend in the Y direction.

Figure 2:
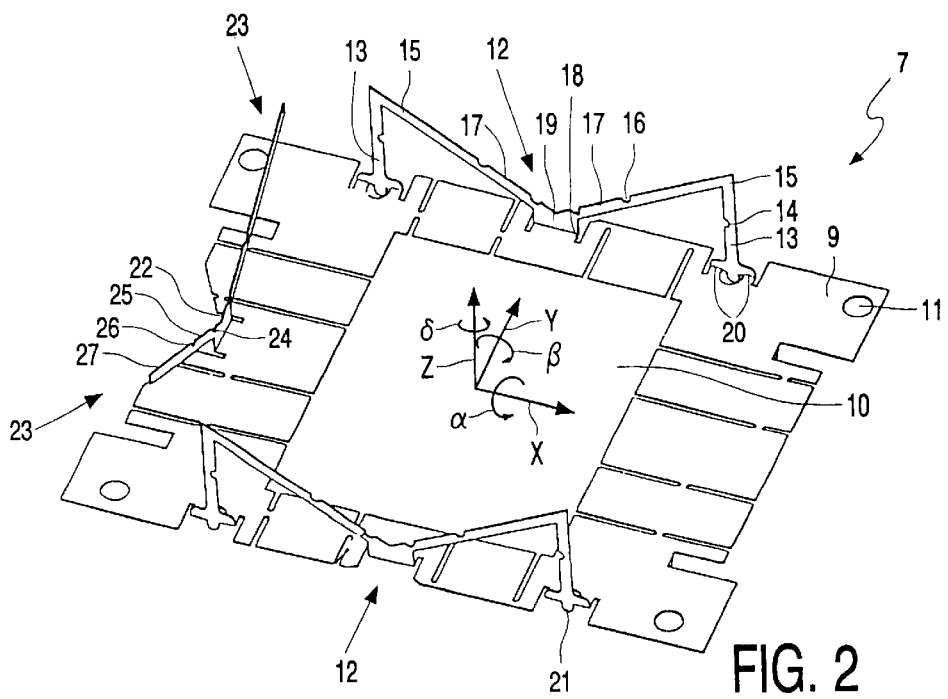
FIG. 2 shows a carrier of the device shown in FIG. 1.

The carrier 7 will be further described with reference to FIG. 2. The carrier 7 comprises a carrier plate 9 which is provided near its center with an aperture 10 to be positioned opposite the light modulation panel 4. The carrier plate 9 is provided along its circumference with apertures 11 for fixation of the carrier plate 9 to the prism 2 by means of the screws 6. The carrier plate 9 further comprises two M-shaped elements 12 which are situated in planes extending in the X and Z directions along the longitudinal sides of the carrier plate 9. Each element 12 has two plate-shaped bridge parts 13 extending transversely to the carrier plate 9 in the Z direction and being connected on a side remote from the carrier plate 9 to a V-shaped element 15 via a blade hinge 14. The V-shaped element 15 is connected to a plate-shaped bar 17 via a blade hinge 16 on a side remote from the blade hinge 14. On a side remote from the blade hinge 16, the bar 17 is connected to a bridge part 19 via a blade hinge 18. The bridge parts 13, 19 are rigidly connected to the carrier plate 9. Each bridge part 13 is connected to the carrier plate 9 via two bridges 20. Between the bridges 20, each bridge part 13 is provided with a supporting element 21. The supporting element 21 extends as far as the side of the carrier plate 9 remote from the M-shaped element 12.

The carrier plate 9 is further provided with a bridge part 22 extending transversely to the carrier plate 9, from which bridge part antennas 23 extending away from each other extend. The antennas 23 are situated in a plane extending in the Y and Z directions. Each antenna 23 comprises a bar 25 connected to the bridge part 22 via a blade hinge 24 and an element 27 connected to the bar 25 via a blade hinge 26.

Before elucidating the positioning of a light modulation panel 4 with respect to the prism 2, the operation of each bar 17, 25 will be described first.

The bars 17, 25 jointly prevent the elements 15, 27 connected thereto from being displaced in the Z direction.

Each bar 17 prevents the element 15 connected thereto from being displaced in a direction extending parallel to the bar 17. In the same way, each bar 25 prevents displacement of the element 27 connected thereto in a longitudinal direction extending parallel to the bar 25.

In the case of a force exerted on the element 15 in the Y direction, the element 15 will pivot about the blade hinges 14, 16.

Similarly, in the case of a force exerted on the element 27 in the X direction, the element 27 will pivot about the blade hinge 26, while simultaneously the bar 25 pivots about the blade hinge 24.

As already described above, the carrier plate 9 is connected to the prism 2 by means of screws 6 inserted through apertures 11. To prevent the supporting elements 21 from being directly supported on the glass of the prism 2, a supporting plate (not shown) may be provided between the prism 2 and the carrier plate 9. Forces exerted on the prism 2 are evenly distributed on the prism 2 by the supporting plate.

After fixation of the carrier plate 9 to the prism 2, a holder 3 accommodating a light modulation panel 4 is positioned opposite the carrier 7. The four slots 8 extending in the X direction are positioned opposite the elements 15, and the two slots 8 extending in the Y direction are positioned opposite the elements 27. Subsequently, the holder 3 is displaced in the direction indicated by the Z direction, while the elements 15 and 27 will extend through the slots 8. Subsequently, the holder 3 can be positioned with respect to the carrier 7. To this end, use is made of an external manipulator (not shown). The holder 3 is displaced in six degrees of freedom by means of this external manipulator. These six degrees of freedom are the displacements already described in the X, Y and Z directions and further a rotation $\alpha$ about an axis extending parallel to the X direction, a rotation $\beta$ about an axis extending parallel to the Y direction and a rotation $\gamma$ about an axis extending parallel to the Z direction. During displacement of the holder 3 in one or more of these directions, the slots 8 are moved with respect to the associated elements 15, 27. Forces in the Y direction and X direction are then exerted on these elements 15, 27, as a result of which the bars 17, 25 connected thereto will pivot about the associated blade hinges. After the holder 3 has been brought to the desired position with respect to the prism 2, the elements 15 and 27 are connected to the holder 3 by means of, for example, UV curing glue. The holder 3 is now no longer displaceable with respect to the prism 2. A displacement in the Z direction is prevented by the bars 17 and 25. Moreover, the six bars 17, 25 prevent a rotation $\alpha$, a rotation $\beta$ and a rotation $\gamma$. A displacement in the X direction is prevented by the bars 17, while a displacement in the Y direction is prevented by the bars 25. The bridge parts 13 connected to the elements 15 prevent the carrier plate 9 near the bridge part 19 from being displaced in the Z direction at a relatively large force exerted in the Z direction on the elements 15. If the carrier plate 9 is relatively rigid, the bridge parts 13 may be dispensed with.

It is possible to manufacture the M-shaped element and the V-shaped element 23 by means of punching or laser cutting from a plate to be formed for the carrier plate 9. Subsequently, the M-shaped elements 12 and the plate part 22 are bent with respect to the carrier plate 9 so as to obtain the carrier 7 shown in FIG. 2.

It is of course also possible to use the adjusting mechanism 5 for other applications, where an accurate positioning of a holder 3 with respect to a carrier is to be obtained.

What is claimed is:

1. A method of positioning a holder with respect to a carrier, characterized in that the holder has at least one slot, while the carrier overlies said holder and is provided with a carrier plate and at least a bar, a first end of which is pivotally connected to the carrier plate and an end remote from the first end is pivotally connected to an element which is slidable in the slot, the element being connected to the holder after positioning the holder with respect to the carrier.

2. A method of positioning a holder with respect to a carrier, characterized in that the holder has at least one slot, while the carrier is provided with a carrier plate and at least a bar, a first end of which is pivotally connected to the carrier plate and an end remote from the first end is pivotally connected to an element which is slidable in the slot, the element being connected to the holder after positioning the holder with respect to the carrier, said method further characterized in that the carrier is provided with a least six bars situated in planes extending transversely to the carrier plate, while at least two bars extend away from each other in a first plane extending transversely to the carrier plate, at least two bars extend away from each other in a second plane extending transversely to the carrier plate, and at least two bars extend away from each other in a third plane situated parallel to the second plane and transversely to the first plane, the holder being fixed with respect to the carrier in six degrees of freedom after connection thereto.

3. A device comprising a holder and a carrier, characterized in that the holder has at least one slot, while the carrier overlies said holder and is provided with a carrier plate and at least a bar, a first end of which is pivotally connected to the carrier plate and an end remote from the first end is pivotally connected to an element which is slidable in the slot, the element being connectable to the holder.

4. A device as claimed in claim 3, characterized in that at least one element is pivotally connected on a side remote from the bar to a bridge part which extends transversely to the carrier plate and is rigidly connected to the carrier plate.

5. A device as claimed in claim 3, characterized in that the carrier is connected to an optical element, while the holder is connected to a light modulation panel to be positioned with respect to the optical element.

6. A device comprising a holder and a carrier, characterized in that the holder has at least one slot, while the carrier is provided with a carrier plate and at least a bar, a first end of which is pivotally connected to the carrier plate and an end remote from the first end is pivotally connected to an element which is slidable in the slot, the element being connectable to the holder, said device further characterized in that the carrier is provided with at least six bars situated in planes extending transversely to the carrier plate, while at least two bars extend away from each other in a first plane extending transversely to the carrier plate, at least two bars extend away from each other in a second plane extending transversely to the carrier plate and at least two bars extend away from each other in a third plane situated parallel to the second plane and transversely to the first plane, the holder being fixed with respect to the carrier in six degrees of freedom by connection thereto.

7. A device as claimed in claim 6, characterized in that at least one element is pivotally connected on a side remote from the bar to a bridge part which extends transversely to the carrier plate and is rigidly connected to the carrier plate.

8. A device as claimed in claim 6 characterized in that the carrier is connected to an optical element, while the holder is connected to a light modulation panel to be positioned with respect to the optical element.

9. A device as claimed in claim 7, characterized in that the carrier is connected to an optical element, while the holder is connected to a light modulation panel to be positioned with respect to the optical element.

10. A device as claimed in claim 9, characterized in that an intermediate plate supporting at least a bar extending transversely to the carrier plate is situated between the optical element and the carrier plate.

* * * * *